United States Patent [19]

Aguirre

[11] 4,049,609
[45] Sept. 20, 1977

[54] PROCESS FOR MODIFYING UNSATURATED POLYESTER SYSTEMS

[75] Inventor: Juan E. Aguirre, Hackensack, N.J.

[73] Assignee: Sintetica Americana, Inc., Hackensack, N.J.

[21] Appl. No.: 630,975

[22] Filed: Nov. 12, 1975

Related U.S. Application Data

[63] Continuation-in-part of Ser. No. 518,071, Oct. 25, 1974, abandoned.

[51] Int. Cl.$^2$ .................. C08L 63/12; C08L 67/06
[52] U.S. Cl. .................. 260/29.6 NR; 260/2.5 N; 260/29.2 UA; 260/29.6 TA; 260/29.6 CM; 260/29.6 MN; 260/40 R; 260/75 T; 260/75 H; 260/397.6; 260/551 S; 260/861; 260/862; 260/865; 260/869; 260/DIG. 24
[58] Field of Search .................. 260/2.5 N, 29.6 NR, 260/29.2 UA, 75 T, 861, 862, 865, 869, 29.6 CM, 29.6 TA, 75 H, DIG. 24, 29.6 MN

[56] References Cited

U.S. PATENT DOCUMENTS

| | | | |
|---|---|---|---|
| 3,591,191 | 7/1971 | Coderre et al. | 277/202 |
| 3,687,883 | 8/1972 | Korf | 260/29.6 NR |
| 3,726,819 | 4/1973 | Dijkhuizen | 260/22 CB |
| 3,806,563 | 4/1974 | Lammers | 264/41 |
| 3,845,067 | 10/1974 | Lopez | 260/29.6 NR |
| 3,923,704 | 12/1975 | Gunning et al. | 260/2.5 N |

OTHER PUBLICATIONS

Leitheiser et al., Water Extended-Polyester Resin, SPE Journal, Oct. (1969) vol. 25, pp. 41–45.

*Primary Examiner*—Murray Tillman
*Assistant Examiner*—Thurman K. Page
*Attorney, Agent, or Firm*—Stephan J. Klauber

[57] ABSTRACT

Unsaturated polyester resin systems are modified to provide a curable, stable water-in-oil emulsion by reacting the resin system with a hydrolized source of hypochlorite ion, while maintaining during the reaction a pH of at least 4, whereby the reaction is predominantly one of chlorohydration. The hypochlorite ion may be provided by addition of an aqueous solution of an inorganic salt of hypochlorous acid, e.g. by an aqueous solution of sodium, potassium, lithium, or calcium hypochlorite; or by an aqueous solution of a suitable chloramine; or the additive may comprise the reaction product of a chloramine with an aqueous solution of an inorganic salt of hypochlorous acid. The modified resin system yielded by the invention may include over 50% by weight of water; and high quantities of conventional fillers may be added without disrupting the emulsion. The cured products yielded from the modified resin systems have excellent mechanical characteristics, and are highly flame-retardant.

18 Claims, 1 Drawing Figure

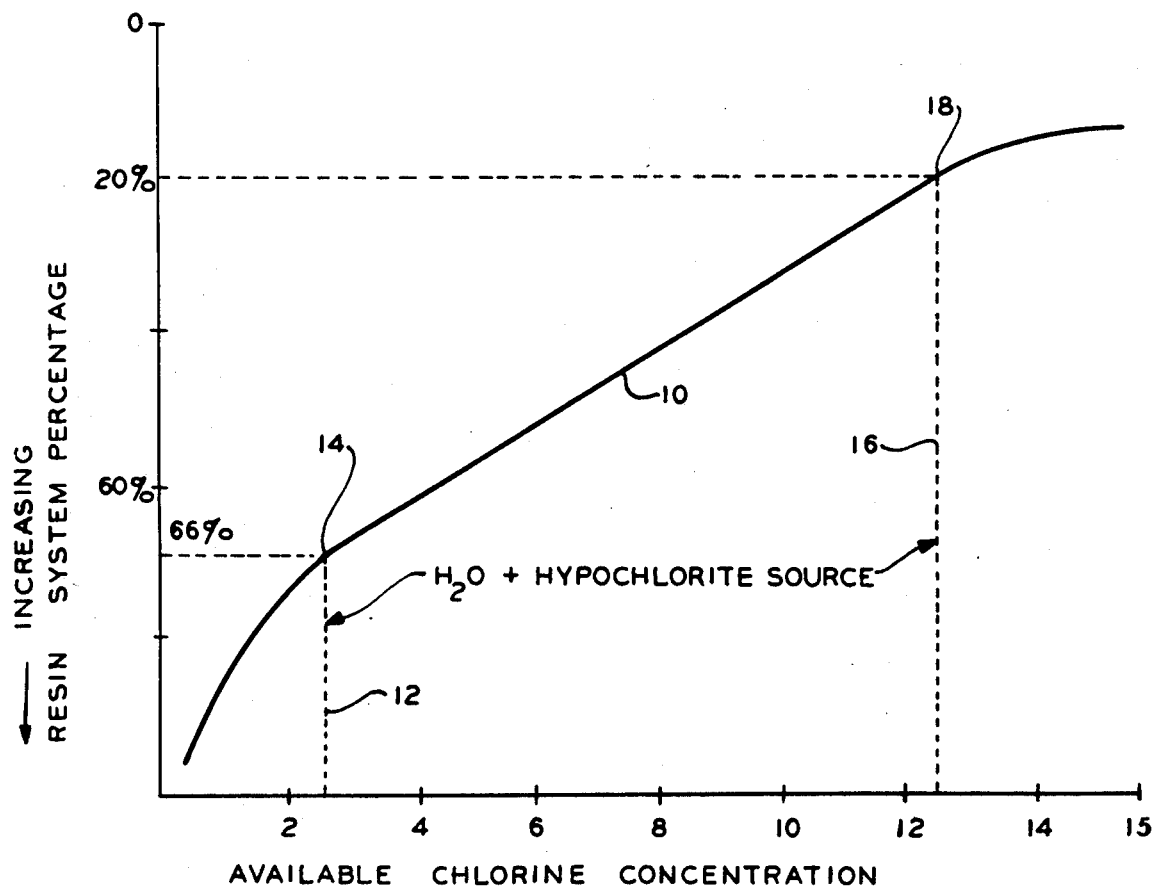

PROCESS FOR MODIFYING UNSATURATED POLYESTER SYSTEMS

This application is a continuation-in-part of my abandoned application, Ser. No. 518,071, filed Oct. 25, 1974, and entitled "Unsaturated Polysters by a Novel Process."

BACKGROUND OF INVENTION

This invention relates generally to polyester resin systems, and more specifically relates to a process wherein unsaturated polyester resin systems are modified to provide curable, stable water-in-oil emulsion systems, which modified systems may include high percentages of added water.

Unsaturated polyester resins have found application in myriad environments, including e.g. in the fabrication of furniture and of similar structures, wherein the thermoset resin provides characteristics which may be highly simulative of wood, or of other materials commonly utilized in these objects. Similarly, such resins are widely utilized in the manufacture, as e.g. by casting, of a large variety of other products including bowling balls, simulated marble, pistol grips, pearlescent buttons, etc.

In a typical, commercially available unsaturated polyester resin system, a linear polyester resin is combined with a cross-linking monomer, the system sometimes including as well, inhibitors which retard cross-linking until the resin system is ready for use by a fabricator. The linear polyester resin is typically produced by reacting at least one dihydric alcohol with at least one dibasic or dicarboxylic acid. Either the alcohol and/or the acid is ethylenically unsaturated. The resultant unsaturated resin will cure or cross-link with adjacent polyester chains of similar structure by direct reaction, or more commonly through the double bond provided by the ethylenically unsaturated monomer, such as styrene. Other typical monomers include vinyl toluene, methyl methacrylate. α-methyl styrene, divinyl benzene, dichlorostyrene and diallyl phthalate. Conventional inhibitors include hydroquinone, quinone, and t-butyl catechol.

It is also known to incorporate in the polyester resin system, various extenders and fillers. Among these are e.g. calcium carbonate, clays, talcs, hydrated alumina, antimony oxide, and various organic fillers - such as e.g. pecan shell flour. These fillers may serve to reduce cost or to modify physical characteristics of the resin, or may serve to reduce shrinkage during curing, or to provide or enhance flame retardance.

Additional background information regarding polyester resin systems, their preparation, use polymerization, etc. may be found in such well-known reference works as *Polyester Resins* by John R. Lawrence, Reinhold Publishing Co. (1960).

Particularly within recent years, the precipitously escalating costs of petrochemicals has generated increasing interest in formulations which might serve to reduce the cost of the polyester resins. Among the concepts that have stimulated great interest, have been reported techniques wherein polyester resins are modified by incorporation of substantial quantities of water to thereby form so-called water-extended polyester resins, known in the art by the designation "WEP." Techniques for preparation of these types of formulations are set forth in many publications, including e.g. in U.S. Pat. Nos. 3,256,219 and 3,666,697. Similarly, reference may be had to such articles as R. H. Leitheister et al "Water-Extended-Polyester Resin," 25 *SPE Journal* 41 (1960).

In many of these prior art techniques water can only be added to the polyester resin by means of high agitation which is a cumbersome and costly technique. In many instances, further, the stress characteristics of the cured products yield by these water-extended resins have been relatively low. Moreover, the stability of the water-in-oil emulsions particularly where produced by the agitation process have been relatively low. Thus, in these cases the emulsion is broken quite readily upon the addition of conventional fillers particularly if such fillers are organic. While methods have recently been reported which enable production of oil-in-water emulsions with limited agitation, numerous of such technique yield modified resin systems having undesirably high viscosity.

Finally it may be noted, that one of the principal difficulties encountered where use of synthetic resin compositions are contemplated, has been the undersirably high flammability of many of these resins, including particularly many of the polyester resins to which the present invention appertains. Among the techniques heretofore utilized for reducing flammability of such unsaturated polyester resins, has been the attachment of chlorine onto the polyester molecule. Other elements that have been similarly used for such purposes, include bromine, phosphorous, and antimony. Thus in a typical procedure where chlorine is used, sufficient of the gas may be added to a polyester dissolved in a solvent, to form a polyester containing 10 to 60% halogen, with the mixture being maintained at suitable temperatures until the desired degree of halogen addition is obtained, after which the solvent is removed to yield the halogenated polyester. The use, however, of the aforementioned fire retardant agents, notably chlorine and other halogens, creates very undesirably handling problems arising from the highly caustic and toxic nature of these elements; and particularly in recent years, the environment impact of such techniques have become of increasing concern.

SUMMARY OF INVENTION

Now in accordance with the present invention, it has unexpectedly been found that curable, highly stable water-in-oil emulsions, may be formed from unsaturated polyester resin systems, by reacting such systems with a hydrolized source of hypochlorite ion, while maintaining during the reaction a pH of at least 4 in consequence of which the said reaction is predominantly one of chlorohydration i.e. a reaction wherein double bonds in the unsaturated resin structure are broken and replaced, by virtue of attachment of —Cl and —OH groups onto the polyester chain. In accordance with the invention the hypochlorite ion may be provided by adding to the polyester resin system an aqueous solution of an inorganic salt of hypochlorous acid, such as for example by adding to the said resin system an aqueous solution of sodium, potassium, lithium or calcium hypochlorite. Alternatively the source of hypochlorite ion which is added to modify the polyester resin system, may comprise an aqueous solution of chloramine, such as a solution of chloramine-T or chloramine-B, or other chloramines exhibiting an hydrolysis constant in the general range of from about $10^{-4}$ to $10^{-8}$. Further, the additive may comprise the reaction product of a chloramine of the aforementioned type, with an aqueous solution of an inorganic salt of hypochlorous acid. The modified resin systems yielded by the invention are found to constitute highly stable water-in-oil emulsions, which can typically include over 50% by weight of water, thus vastly reducing the amount of costly polyester resin required to produce a given cured product. The resultant cured products are found to have excellent mechanical characteristics with respect to strength, modulus, etc., and are furthermore highly flame-retardant.

BRIEF DESCRIPTION OF DRAWING

The FIGURE appended hereto is a graph, wherein the curve depicts the correlation between resin system content and available chlorine content in the hypochlorite source used to modify the original resin system, for modified systems exhibiting good stability.

DESCRIPTION OF PREFERRED EMBODIMENT

As utilized herein it will be understood that the term "polyester resin system" shall refer to a thermo-setting composition comprising a solution of a cross-linkable unsaturated polyester resin in a vinyl monomer, the system sometimes including as well, fractional percentages of inhibitors, as already mentioned. Suitable vinyl monomers, some of which have been heretofore indicated, include the vinyl aromatics such as styrene, vinyl toluene, $\alpha$-methylstyrene, $\alpha$-chlorostyrene, divinyl benzene or so forth. Further, vinyl monomers, such as the lower acrylates, methacrylates, vinyl acetate, the lower vinyl ethers, and acrylonitrile are also applicable cross-linking agents for the unsaturated polyesters. The preferred vinyl monomers for use with the invention, however, are the vinyl aromatics, and particularly styrene. As is known in the present art, the unsaturated polyester and the vinyl monomer can be combined over a wide range of weight ratios, as for example, from 1 to 9 to 9 to 1, respectively. Preferred compositions are those containing from about 35 to 65 parts by weight polyester, and correspondingly from about 65 to 35 parts styrene. It will be understood that in the Examples which ensure herein, all of the polyester compositions set forth are of the type considered in this paragraph.

The linear polyester which forms part of the aforementioned polyester resin system, is usually the condensation product of an unsaturated dibasic acid which is the source of $\alpha,\beta$ ethylenic unsaturation, and a glycol. In a usual procedure a satuated dibasic acid is employed with the unsaturated acid to modify the degree of unsaturation, to thereby vary the reactivity of the resultant resin. The unsaturated intermediates are commonly maleic anhydride and fumaric acid. The saturated acids can e.g. be phthalic anhydride, isophthalic acid, and adipic acid. Among suitable glycols are propylene glycol, ethylene glycol, diethylene glycol, and dipropylene glycol. Further details regarding polyester resin systems are set forth in numerous places in the literature, including the John R. Lawrence test previously referenced.

In accordance with one aspect of the present invention, it has been found that the modified polyester resin systems may suitably be prepared by adding to conventional polyester resin systems, aqueous solutions of inorganic salts of hypochlorous acid, most notably by adding to such systems aqueous solutions of lithium, sodium, potassium and/or calcium hypochlorite. The aqueous solutions so utilized should include concentrations of the hypochlorite such that the available chlorine content of the solution is in the range of from about 2.5 to 15%, with a preferably range being from about 5 to 15%. As utilized herein, it will be understood that the term "available chlorine" has a standard well-defined meaning recognized in the chemical arts. In particular, "available chlorine content" of a solution is determined by titrating the iodine which the said solution will liberate from an acidified iodide solution. The calculated weight of elemental chlorine required to liberate the same amount of iodine is thus the "available chlorine content" of the said solution. Since only half of the chlorine of the $Cl_2$ molecule is positive in solution, the available chlorine content of a hypochlorite (and also of chloramine which will be hereinbelow considered) is twice the "active" (positive) chlorine content.

In those instances where the pH of the polyester resin is below 4, it further will be evident that the hydroxyl ion introduced by hydrolysis of the aforementioned hypochlorite salts, will serve to increase the pH of the reaction system to a pH above 4 in consequence of which chlorohydration will predominate as opposed to the possibility of oxidation.

The aqueous hypochlorite solutions of the above type are preferably added to the polyester resin system in quantities such that approximately 15 to 70% by weight of the resultant modified system is the original resin systems, with the balance being the hypochlorite solution. (Higher resin content can also be present as will be further discussed in connection with the Figure, but from a viewpoint of economy the advantages of the invention begin to decrease as the resin content rises about about 70%.) Since the hypochlorite solution includes the inorganic salts and water, the ratio between the salt and the water will depend upon the available chlorine content in the particular solution. However, it will be clear that the percentage of treating solution present in the modified resin system (i.e. preferably 30 to 85% by weight), when coupled with the available chlorine content in such solution (i.e. from about 2.5 to 15%), provides boundary conditions which define the specific salt and water content for any given modified composition.

EXAMPLE I

In the present instance the treating solution used to modify the polyester resin system comprised a water solution of lithium hypochlorite having an available chlorine content of 5.0%. One part by weight of this treating solution was added to two parts by weight of a commercially available polyester resin system. The said resin in particular was a resilient, high reactivity polyester resin system available from Marco Chemical Div. of W. R. Grace & Co. under the designation "GR-11015." The initial temperature of the system was approximately 20° C (ambient), and the mix of resin system and treating solution was stirred, with an almost immediate exotherm of about 15° C above the initial temperature. Hand mixing was continued until a uniform product was obtained. At this point in the process a marked change in resin color was noted. On the basis of the reaction conditions, it is believed that this change evidenced replacement of the double bonds in the unsaturated structure, by virtue of attachment of —Cl and —OH groups. This would effectively destroy the resonating structure of the molecules, with the consequent loss of color. The resultant product was a highly stable water-in-oil emulsion that showed good stability, i.e. no tendency to separate over any observed period. The viscosity of the modified product was virtually unchanged in comparison to the original resin system.

EXAMPLE II

After cooling, 60% by weight of calcium carbonate was added (as a filler) to the modified composition of Example I, which was then catalyzed with 1% M.E.K. peroxide (based on resin system content) and utilized in the present Example for purposes of fabricating a table leg -- by casting in a mold. A wood core was utilized in order to increase the strength of the part. For purposes of comparison, two parts by weight of the original resin system (GR-11015) containing 50% total weight of calcium carbonate as filler, was catalyzed with 1% M.E.K., peroxide and cast as just indicated in a table leg mold. A wood core was similarly used to increase the strength of the resultant part. It was observed that the part prepared utilizing the composition of the invention exhibited complete absence of cracking around the wood, as did as well the part based upon the prior art composition. Thus the composition of the invention produced substantially equivalent results herein, i.e. in neither instance was cracking or warping observed. However, by means of the present invention, a third or more of the costly, unsaturated polyester resin was eliminated, i.e. a water solution of an inexpensive hypochlorite was effectively substituted for portions of the resin.

Where calcium carbonate is used as a filler, approximately 40 to 60% by weight of the total system, is a preferably range of addition. Other fillers utilizable with the modified resin compositions of the present invention include glass bubbles, talc, pecan shell flour, glass fiber, cotton floc, etc. It may be noted in this connection that several of the aforementioned fillers, most notably the pecan flour, may be effectively utilized with the compositions of this invention without substantially impairing the stability of the emulsion, whereas many prior art water-in-oil emulsion systems produced from polyester resins may not be effectively utilized with organic fillers. Thus in the present instance, typical additional ranges of 20 to 40% of the pecan shell flour may be effectively utilized with the compositions of the invention, such as the composition of Example I herein.

The modified resin systems of the invention including the modified resin system of Example I, may be catalyzed with any of the conventional catalysts utilized in the art for such purposes including those discussed in the "Background" portion of this specification.

EXAMPLE III

In this Example a conventional liquid polyester resin system, obtained from Marco Chemical Division of W. R. Grace & Co., under the product designation "GR 17060," was modified by the method of the invention, and then utilized for preparing cured castings. The monomer present in this system is primarily divinyl benzene.

In particular, 66 parts by weight of the said resin system was initially combined with 34 parts by weight of a 7% available chlorine, aqueous solution of sodium hypochlorite. This mix produced an exotherm of about 60° F. Slow stirring was employed until full emulsification was obtained, i.e. to yield what appears as a single phase. A promoter was then prepared by the addition of 20 parts by weight dimethyl analine (DMA) to 100 parts by weight cobalt octoate, the cobalt octoate being used as a 12% solution. The promoter was incorporated into the modified resin system at three different addition levels, i.e. at .5%, at 1.0% and 1.5%, based on the resin content. In each instance, following the addition of the promoter, the milky white emulsion changed in color to a white medium tan, but retained the same consistency. All of the samples displayed the same viscosity as that of the unreacted, original resin system. Methyl ethyl ketone (MEK) peroxide was then used as a catalyst for curing of the three samples, in a concentration of .5% based on the resin content. No heating was necessary for the cross-linking reaction. The resultant samples were subsequently examined in order to determine such characteristics as impact strength, and flexibility. The data thereby yielded is set forth in Table I hereinbelow.

Table I

| Samples | 1 | 2 | 3 |
|---|---|---|---|
| Polyester resin system parts by weight | 66 | 66 | 66 |
| NaOCl + H$_2$O | 34 | 34 | 34 |
| DMA/Cobalt (% based on resin system) | 1.0 | 1.5 | .5 |
| Gel Time | 5 min. | 4.0 min. | 9.5 min. |
| Impact Strength | Good | Good | Good |
| Curing Time (Green or Demold Cure) | 14 min. | 12 min. | 25 min. |
| Flexibility ⅛" rod | Satis. | Satis. | Satis. |

EXAMPLE IV

In this Example so-called rigid and flexible polyester resin systems were utilized in the course of preparing test samples by means of the method of the invention. Two liquid resins were thus utilized which are commercially available products of Marco Chemical Div. of W. R. Grace & Co., sold under the trade names "LB 402-41" and "GR 17060." These two liquid resins were blended in a 50—50 weight proportion, and after modification by the method of the invention were rendered as cured castings. Various concentrations of aqueous solutions of a hypochlorite were used in the course of such method.

The GR 17060 product display medium reactivity, and is a flexible resin; the principal monomer incorporated in such system is divinyl benzene. The LB 402-41 is a low viscosity, rigid resin system, in which the monomer is styrene.

Pursuant to the present Example, four test samples were prepared. In the instance of Sample 1, 33 parts by weight of GR 17060 were blended with 33 parts by weight of the LB 402-41. After good blending was obtained by stirring, 34 parts by weight of a 5% available chlorine, solution of sodium hypochlorite was added with slow agitation, resulting in a white milky emulsion. An exotherm of about 75° F was observed in consequence of the reaction between the resin and hypochlorite. Thereafter a blend of DMA and 12% cobalt octoate in a ratio of 20 parts DMA to 110 parts 12% cobalt octoate was added to one-fifth of the emulsion in a ratio of 1% of the resin content of the emulsion portion used.

A second sample, Sample 2, was prepared utilizing another one-fifth of the emulsion just described, to which 20 parts by weight (of resin) of glass bubbles was added as a filler. The said glass bubbles were those available under the designation B-25B from the 3-M Company, and the composition was promoted as in the preceding paragraph.

A third sample, Sample 3, was prepared, again utilizing one-fifth portion of the above emulsion, to which 30 parts by weight (per hundred of resin) of the glass bubbles B-25-B was added; and this was again promoted as above described.

A further sample, Sample 4, was prepared, utilizing two-fifths of the previously prepared emulsion, together with 20 parts per hundred (of resin) of glass bubbles B-25-B as filler, and with the further addition of 20 parts per hundred resin of calcium carbonate. This sample was again promoted pursuant to prior description.

All of the four samples above described were found to be dispensable by machine or hand, by virtue of their low viscosities, which ranged to about 2000 cps. All of the samples were observed to be in a single phase condition after the addition of filler, i.e. the emulsification was in no way disrupted. Furthermore, even after two weeks of shelf life, the samples showed but a slight sign of separation; and even under these conditions the emulsion was rapidly restored with but minor agitation.

All of these samples were thereupon catalyzed by the use of methyl ethyl ketone peroxide, with an active oxygen content of 11%. The material so utilized is available under the trade designation of LUPERSON DSW from Wallace & Tiernan INC., Lucidol Division.

The cured samples thereupon resulting in consequence of the foregoing were tested for various properties, with the resultant data being obtained as in Table II below.

Table II

| Samples | 1 | 2 | 3 | 4 |
|---|---|---|---|---|
| Compressive (psi)Strength | 7500 | 4800 | 3500 | 5200 |
| Linear Strength (oven 158° F 14 days) | less than .9% | less than .6% | less than .5% | less than .6% |
| Warpage | None | None | None | None |
| Tensile Strength(psi) | 12,500 | — | — | — |
| Elasticity ⅛" rod | Satis. | Satis. | Satis. | Rigid |

All of the samples 1 through 4 of this Example showed considerable resistance to ignition by fire. The resistance characteristics were higher with those containing fillers. All samples further, showed self-extinguishing characteristics after ignition which characteristics increased with higher content of fillers.

In considering further the data of Table II, it may be pointed out that the problems of shrinkage and warpage have been exceedingly serious in connection with prior art water-modified, or so-called WEP systems. This is quite aside from the impairment of physical strength characteristics noted in such prior art materials, even at modest levels of water content. It will be evident from the Table II that shrinkage in Samples 1 through IV of this Example are very low, and are indeed less than observed in conventional filled polyester resins. Further, none of the samples showed any signs of warpage.

EXAMPLE IV

In this Example, identical procedures as set forth in the preceding Example, were utilized in preparing test samples, except that in a first group of samples the modification of the original resin systems was effected with a 5% available chlorine aqueous solution of lithium hypochlorite; and in a second group of samples, modification was effected with a 15% available chlorine aqueous solution of sodium hypochlorite. The resultant physical properties in the cured samples were generally in accord with the properties indicated in Table II above.

EXAMPLE V

In the present Example the flame retarding or self-extinguishing characteristic of the products yielded by the invention were demonstrated. In particular castings prepared as in Example II were subjected to the industry test HLT-15 (specification established by Hooker Chem. Co. to test burning of thermosetting resins). In accordance with the procedure of this test, strips measuring 0.125 × 0.05 × 8 inches are used for each material evaluated. The burner is a 7/16 inch Terrill with an adjusted flame of 1.5 inches for the inner blue cone, and a flame height of approximately 5 inches. The axis of the burner was tilted to an angle of 20° from the vertical. The time of burning application is measured in seconds. Of five experiments conducted, all samples passed successfully the 25 sec. application of heat, and exhibited self-extinguishing before the 50 sec. mark was reached.

The above Examples have been particularly set forth, utilizing solutions of sodium and of lithium hypochlorites. Thus, as is well-known, the lithium hupochlorite in an aqueous solution hydrolizes according to the equation (1) $LiOCl + H_2O \rightarrow LiOH + HOCl$ Similarly, other inorganic hypochlorites are suitable for the present purposes, including most notably, sodium hypochlorite and calcium hypochlorite. The latter two substances hydrolyze in aqueous solution in accordance with equation (2) and (3) below, to again yield (at equilibrium) hypochlorous acid, thereby providing the hypochlorite ion deemed useful in connection with the present invention.

(2) $NaOCl + H_2O \rightarrow NaOH + HOCl$
(3) $Ca(O\,Cl)_2 + 2\,H_2O \rightarrow Ca(OH)_2 + 2\,HOCl$ Of course it will be evident that the hypochlorite-containing treating solution can be prepared by any of the well-known techniques in the art. For example, as is well-known, such a solution can be prepared by passing gaseous chlorine into a solution of sodium carbonate. By virtue of hydrolysis, a solution of the latter is quite alkaline and two reactions take place, i.e.:

(5) $Cl_2 + CO^{2-}_3 \rightarrow Cl^- + OCl^- + CO_2$
(6) $Cl_2 + 2OH^- \rightarrow Cl^- + OCl^- + H_2O$ In accordance with a further aspect of the present invention, it has been found that many chloramines are also suitable in aqueous solution for the present purposes. In particular, upon hydrolysis chloramines, as is well-known, yield hypochlorous acid, i.e. hypochlorite ion. A simple example of this is as follows:

(7) $NH_2Cl + H_2O \rightarrow NH_3 + HOCl$
(8) $RR'NCl + H_2O \rightarrow RR'NH + HOCl$ where R and R' are respectively $CH_3$ and $SO_2$ groups. The chloramines found to be useful with the present invention are primarily those with an hydrolysis constant in the range of about $10^{-4}$ to $10^{-8}$. Among the suitable compounds of this type are chloromine-T with an hydrolysis constant of $4.9 \times 10^{-8}$, dichloramine-T with an hydrolysis constant of $8.0 \times 10^{-7}$, and chloramine-B. Other chloramines deemed suitable for use with the invention include N-chloroformanilide, N-chloro-o-acetotoluide; N-chloro-p-acetotoluide, and N-o-dichloroacetanilide.

EXAMPLE VI

A chloroamine, viz. chloramine-T was dissolved in water in quantities appropriate to yield treating solutions, having available chlorine concentrations of 3.5%, 7.5% and 12%. 100 parts of the 7.5% available chlorine solution was added to 100 parts by weight of a rigid and promoted high reactivity resin system, available under the trade name of "Laminac 4128" from American Cyanamid Co. (Due to the slower hydrolysis of chloramines in comparison to the aqueous solutions of inorganic hypochlorites, the said treating solution was checked after dilution of the solids in water for available chlorine content.) It was observed that emulsification preceded in more ready fashion than was the case where the inorganic hypochlorite solutions of the prior Examples were used alone. The resultant emulsion was of excellent stability, and no separation of the two phases was noted over a period of four weeks.

The same procedure as just described was followed with the 3.5% and 12% available chlorine treating solutions. Similar results were observed as above described.

EXAMPLE VII

In the present Example chloramine-T-was utilized to prepare an aqueous treating solution for modifying a polyester resin system. Chloramine-T, also known as n-sodium-n-chloro-para toluene-sulfonamide, has the structure formula

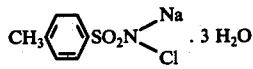

or $C_7H_7SO_2NNaCl \cdot 3H_2O$

The active chlorine content of chloroamine-T is 12.5, corresponding to available chlorine content of 25.0%. The chloramine-T was dissolved in warm water (50° C), to provide several differing samples, with weight concentrations of chloramine-T varying from 5 –30%. It was necessary to maintain the temperature above 50° C but below 60° C, in order to obtain a clear solution.

To five distinct samples of the solution, containing 5, 10, 15, 20 and 30% concentration of chloramine-T there was added a 15% available chlorine aqueous solution of sodium hypochlorite. In each instance 100 parts by weight of the chloramine-T solution was used with 100 parts by weight of the hypochlorite solution. In all instances a clear solution was maintained by keeping the temperature above 50° C, but below 60° C. Thereafter the samples were cooled to room temperature, upon which a precipitate began forming, the precipitate being characterized by very small crystals. A pearlescent, low melting point (about 30° C) crystallized material was thus obtained. This material could be dissolved in aqueous solution by heating slightly above room temperature.

Two further samples were prepared according to the foregoing procedure, utilizing an aqueous solution (15% available chlorine) of lithium hypochlorite to replace the sodium hypochlorite.

The resultant pearlescent crystaline substance was waxy in nature, and was found to have excellent handling characteristics, particularly in comparison to the aqueous solution of the hypochlorites alone of the aqueous solution of the chloramines, such as aqueous solution of chloramine-T. In particular, virtually no chlorine odor was apparent, and additionally the inconvenience associated with handling chloramine-T was in powder form could thereafter be avoided by a user.

The resulting reaction product, i.e. the reaction product of the chloramine with the hypochlorite, was subsequently used in a variety of examples, wherein the said material was added to polyester resin systems of the types previously defined in the "Background" portion of this invention, and considered in the foregoing Examples. In general, it was found that the combination of the high activity of the hypochlorite together with the reducing agent of the amine, yielded more stable emulsions and lower viscosity in the resulting, modified systems. Excellent rates of chlorohydration were yielded as well, which in turn enabled the use of higher percentages of filler, which is, of course, economically advisable. The resultant water-in-oil emulsion systems could effectively incorporate a total quantity of water exceeding 50% of the weight of the modified system, with the specific physical properties in each instance being a function of the total amount of water used, and of the particular polyester resin.

In a typical procedure the waxy precipitate yielded by the aforementioned reaction may be directly used, i.e. with its water content as provided by the hypochlorite solution. In some instances heating is advisable to adjust viscosity of the product to a suitable flow level. Water may be added at any stage of the reaction, i.e. additional water may be added during heating of the precipitate to provide a desired viscosity in relation to the temperature; or the heated precipitate, which then has appropriate pouring characteristics, may be added directly to the original polyester resin system, together with additional water; or the water may be subsequently added to the modified system. In each instance, as mentioned, the amount of water can reach a desired level, which may exceed 50%.

The reaction product utilized in this Example to modify the polyester resin systems, may be derived from any of the chloramines described in connection with Example VI. Similarly, the aqueous hypochlorites may comprise solutions of the inorganic salts of hypochlorous acid, particularly the sodium, potassium, and lithium or calcium hypochlorite solutions which have previously been mentioned.

Certain aspects of the compositional ranges which may be utilized in accordance with the invention, are illustrated by the FIGURE appended hereto, which is a graph wherein the curve 10 depicts the correlation between resin system content and available chlorine content for the hypochlorite source used to modify the original resin system. More specifically, curve 10 of the Figure plots as ordinates the resin system percentage against the available chlorine concentration of the hypochlorite source used in the course of modifying the original resin system. The curve 10 represents a relatively optimal ratio as between the original resin system and the hypochlorite source, i.e. the ratios between the two indicated by the curve in general corresponds to a modified system having maximum stability. However, all ratios under the said curve may be regarded as stable; and furthermore, points residing above the curve can be stable as well, to a degree, however, which depends upon the reactivity of the specific resin system involved.

The significance of curve 10 may be better appreciated by considering a typical instance of its application. Assuming, for example, that an available chlorine concentration of 2.5% is present in the hypochlorite ion source utilized, we note that the ordinate 12 passing through the 2.5% abscissa intersects curve 10 at the point 14, which corresponds to an approximate resin content of 66%. This means that an optimally stable system treated with a 2.5% available chlorine concentration additive, will include 66% of the unmodified resin system, with the balance (which is specifically indicated by the "length" of ordinate 12, i.e. 34% of the modified system, comprising the hypochlorite ion source together with water.

It will, of course, be evident that differing types of hypochlorite ion sources, as previously discussed in this specification, may be utilized to provide a 2.5% available chlorine concentration. What the discussed Figure implies, however, is that irrespective of the source of the hypochlorite ion (and still referring to the same exemplary use of the curve) the 2.5% available chlorine form of such additive will (in the optimally stable system) constitute 34% of the resulting modified system when the water content of the additive is also taken into account. Curve 10 therefore provides boundary conditions that will enable the precise determination of the amount of any particular hypochlorite source which is to be added; i.e. utilizing any particular source in the example given, the boundary conditions are (1) that the available chlorine content is 2.5%, and (2) that the amount of the hypochlorite source and water added will constitute 34% of the resultant modified system. These two boundary conditions are fully sufficient to define in any given instance, by direct calculation, the amount of the hypochlorite source per se. Thus, in this particular instance, if the hypochlorite source were an aqueous solution of NaOCl, the calculation indicate that with the 2.5% solution of interest, approximately 70% of the 34% content represented by ordinate 12 would be water -- so that approximately 24% of the modified system would be water content.

As a further example of the application of the curve 10, one may consider the ordinate 16, where an available chlorine content of 12.5% is utilized in the additive. Were chloramine-T the source of the available chlorine, we take note initially of the fact that chloramine-T solid has an available chlorine content of 25.0%. If 50 grams of chloramine-T is diluted in 50 grams of warm water a solution is provided having 12.5% available chlorine. At this concentration the intersection of the curve 10 at point 18 indicates a corresponding resin system content of 20%, i.e. for a relatively optimal (from viewpoint of stability) formulation. The ordinate 16 thus indicates that of the remaining part of the modified system, 40% would comprise solid chloramine-T, and the remaining 40% water. It is again emphasized that the curve 10 is the relatively optimal stability condition; but that at least all points residing beneath curve 10 represent stable systems prepared by the invention. Similarly it will be evident that in numerous combinations indicated by the graph, the total water content in the modified resin system, will readily exceed 50% by weight of the said modified system.

The said graph also indicates that in the general case the resin system content (i.e. the quantity of the original resin system) can range to at least 70%, and down to about 15%, and still yield good stable systems with use of treating solutions with appropriate available chlorine contents -- this regardless of which of the treating solutions of the invention are used. As mentioned earlier, higher resin contents than 70% are also utilizable, but the advantages of the invention begin to wane at the increasingly high resin ranges.

While the present invention has been described in terms of specific embodiments thereof, it will be understood in view of the instant disclosure that numerous variations upon the invention are now enabled to those skilled in the art, which variations yet reside in the scope of the present teaching. Accordingly the invention is to be broadly construed and limited only the scope and spirit of the claims now appended hereto.

I claim:

1. A process for modifying an unsaturated polyester resin system to provide a curable, stable water-in-oil emulsion system, comprising:
   reacting said polyester resin system with a hydrolized source of hypochlorite ion, while maintaining during the duration of said reaction a pH of at least 4, whereby said reaction is predominantly one of chlorohydration to yield said curable emulsified system; said source of hypochlorite ion being an aqueous solution having an available chlorine content in the range of from 2.5 to 15%, which is added to said polyester resin system in quantities such that the original resin system comprises about 15 to 70% by weight of the resultant modified system.

2. A method in accordance with claim 1, wherein said hypochlorite ion is provided by adding to said resin system an aqueous solution of an inorganic salt of hypochlorous acid.

3. A method in accordance with claim 2, wherein the available chlorine content is in the range of 5% to 15%.

4. A method in accordance with claim 2, wherein said comprises sodium hypochlorite.

5. A method in accordance with claim 2, wherein said salt comprises calcium hypochlorite.

6. A method in accordance with claim 2, wherein said salt comprises lithium hypochlorite.

7. A method in accordance with claim 1 wherein said hypochlorite ion is provided by adding to said resin system an aqueous solution of a chloramine.

8. A method in accordance with claim 7, wherein said chloramine has a hydrolysis constant in the range from about $10^{-4}$ to $10^{-8}$.

9. A method in accordance with claim 8, wherein said chloramine comprises chloramine-T.

10. A method in accordance with claim 8, wherein said cloramine comprises chloramine-B.

11. A method in accordance with claim 1, wherein said hypochlorite ion is provided by adding to said polyester system the reaction product of a chloramine with an aqueous solution of an inorganic salt of hypochlorous acid.

12. A method in accordance with claim 11, wherein said chloramine has a hydrolysis constant in the range of from abut $10^{-4}$ to $10^{-8}$.

13. A method in accordance with claim 12, wherein said chloramine comprises chloramine-T.

14. A method in accordance with claim 12, wherein said salt is selected from one or more members of the group consisting of sodium and lithium hypochlorite.

15. A curable, water-in-oil emulsion system comprising:
   a resin system comprising at least one unsaturated polyester resin prepared by reaction of a polybasic carboxylic acid and a dihydric alcohol, and including at least one unsaturated monomer cross-linkable therewith; and a hydrolyzed source of hypochlorite ion reacted with said resin system at a pH of 4 or higher; said source comprising an aqueous solution having an available chlorine content in the range of from 2.5 to 15%; said aqueous solution being present in quantities such that the original resin system comprises from about 15 to 70% by weight of the said emulsion system.

16. An emulsion system in accordance with claim 15, wherein said aqueous solution comprises a solution of an inorganic salt of hypochlorous acid.

17. An emulsion system in accordance with claim 15, wherein said aqueous solution comprises a solution of a chloramine having an hydrolysis constance in the range of from about $10^{-4}$ to $10^{-8}$.

18. A curable emulsion system in accordance with claim 15, wherein said solution comprises the reaction product of a chloramine with an aqueous solution of an inorganic salt of hypochlorous acid.

* * * * *